Feb. 27, 1934.  R. A. COLGIN  1,949,368

PULL ROD CONNECTION

Filed Aug. 31, 1933

Rufus A. Colgin.
INVENTOR.

BY *James R. Cole*

ATTORNEYS.

Patented Feb. 27, 1934

1,949,368

UNITED STATES PATENT OFFICE 1,949,368

PULL ROD CONNECTION

Rufus A. Colgin, Tulsa, Okla., assignor to W. C. Norris, Tulsa, Okla.

Application August 31, 1933. Serial No. 687,637

1 Claim. (Cl. 24—123)

My invention relates to new and useful improvements in pull rod connections to knockoff or disconnecting bars or plates and the like, and has for its object to provide a semi-flexible structure in detachable form which is cheap to make, easy to attach and replace, and which will adjust itself in line with the tension placed upon it.

With the above and other objects in view which will appear as the description proceeds, my invention consists of the novel features hereinafter set forth in detail, illustrated in the occompanying drawing and more particularly pointed out in the appended claim.

Referring to the drawing in which like numerals designate similar parts throughout the several views.

Figure 1:
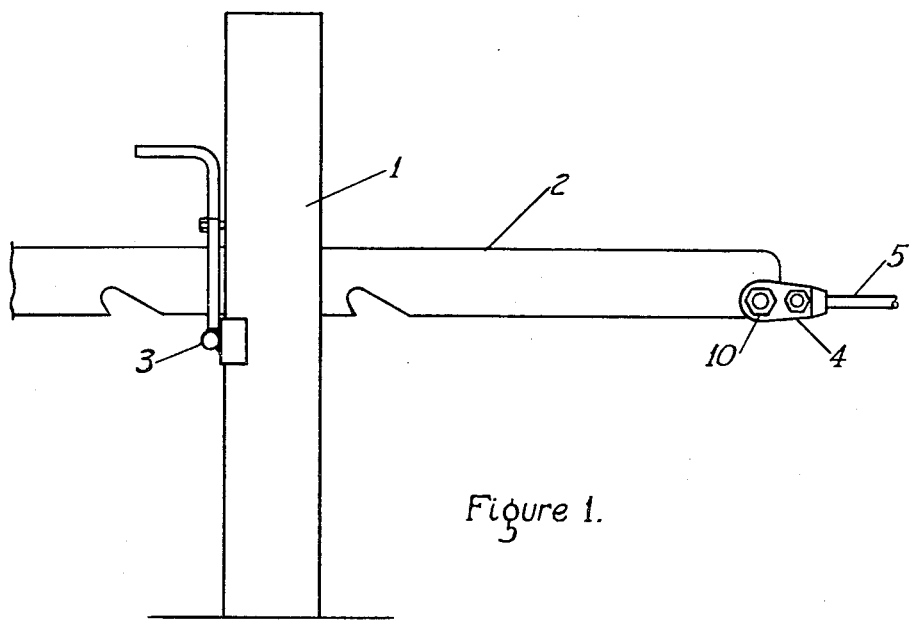
Fig. 1 is a view in side elevation of a knockoff bar and post with my clamp connection thereon.

In the drawing 1 represents a knockoff post, 2 a knockoff bar or plate, 3 a knockoff block, all of which are of conventional design, 4 my clamp connection in general, and 5 a pull rod connected with said knockoff bar through my clamp connection 4.

Figure 2:
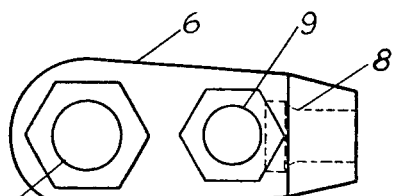
Fig. 2 is a top plan view of my clamp connection.
Figure 3:
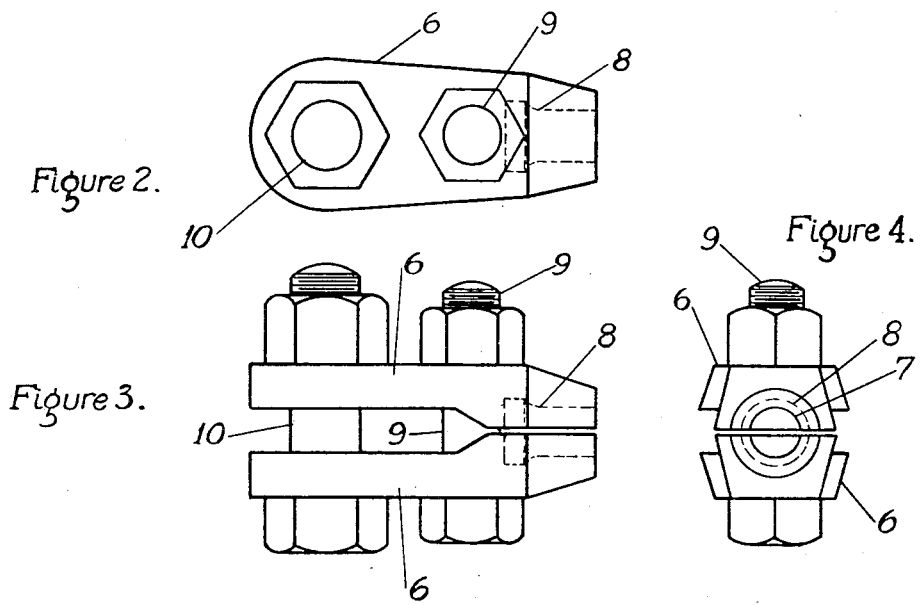
Fig. 3 is a view of the same in side elevation.
Figure 4:
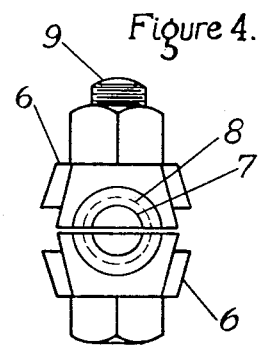
Fig. 4 is a view of the rod end portion of the same in front elevation.

6 represents one of the pair of body portions or members of my clamp connection, the same being provided with a socket 7, as shown in Fig. 4 which socket is also indicated by dotted line 8 in Figs. 2, 3 and 4, to receive the head of pull rod 5. 9 and 10 respectively represent clamp bolts through which the clamp is drawn together to provide the connection mentioned, with bolt 10 passed through bar 2, as indicated in Fig. 1 which bolt 10 are also acts as a tension member between said bar and clamp connection.

In operation my clamp is attached to the rodline and knockoff plate as aforesaid. The connection made is semi-flexible and permits the clamp to adjust itself with relation to the direction in which the strain is placed upon it. As there is generally present a vibration in this connection when the rodline is first hooked on, and as a rodline is frequently hooked on and off, the semi-flexible nature of my connection makes it stronger and more lasting than those heretofore made, as well as permits it to be easily attached and removed.

Having thus fully disclosed my invention, what I claim and desire to secure by Letters Patent is:

A clamp coupling comprising a pair of clamp members each of which has a recess at one end thereof adapted to receive a pull rod head when the two members are clamped together and each of which also has an offset portion to the end wherein said recess is located, to the effect that when placed together the pair of clamp members form a whole structure wherein one end is bifurcated and the other end contains a socket for a pull rod head, a bolt hole in the offset portion of each of said clamp members and positioned therein to align each with the other when said separate clamp members are arranged in pairs, and a second bolt hole in each of said clamp members and positioned therein intermediary of said first mentioned bolt hole and said recess and to align each with the other when said separate clamp members are arranged in pairs, and bolts for said clamp members adapted to be passed thru the respective bolt holes aforesaid.

RUFUS A. COLGIN.